UNITED STATES PATENT OFFICE.

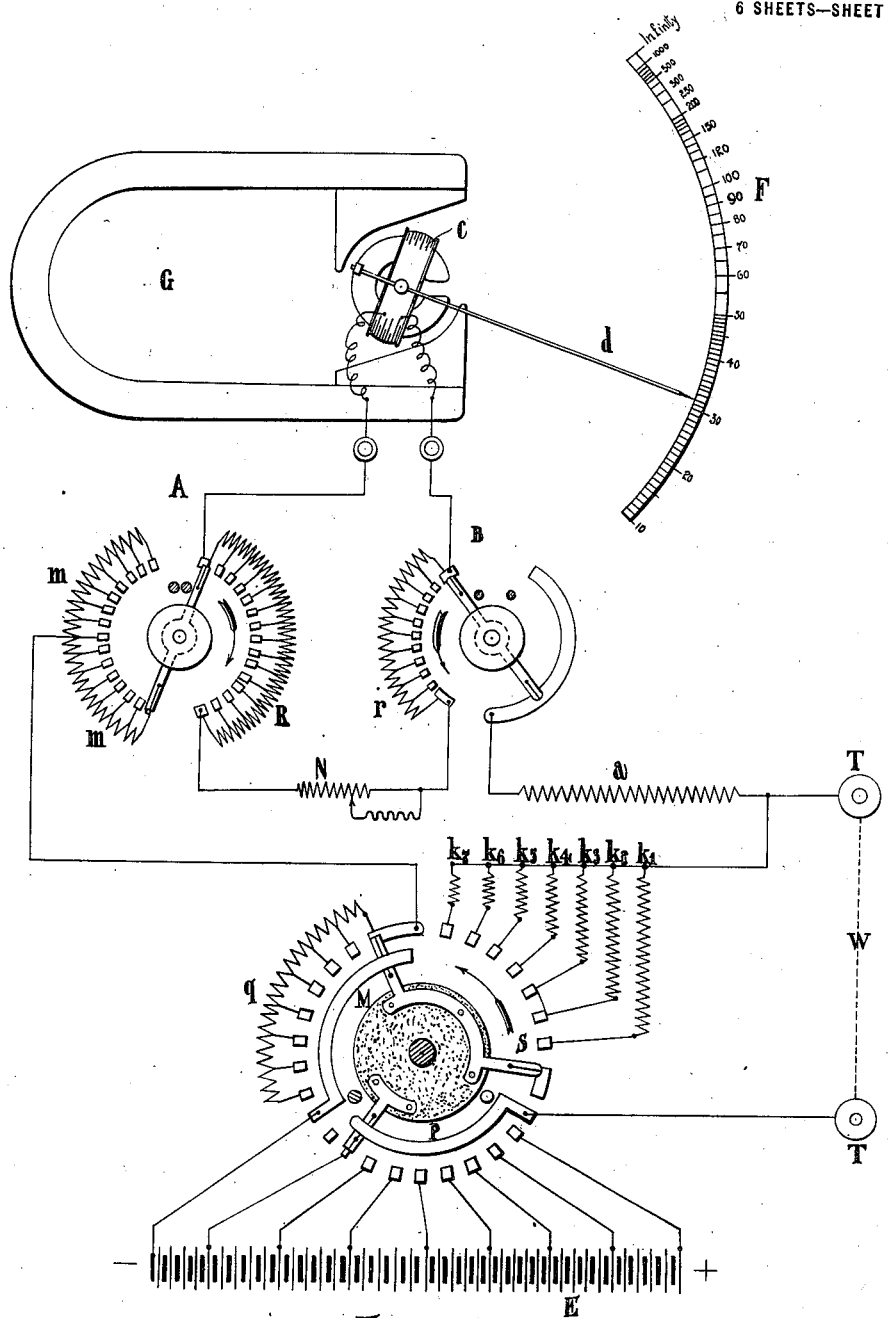

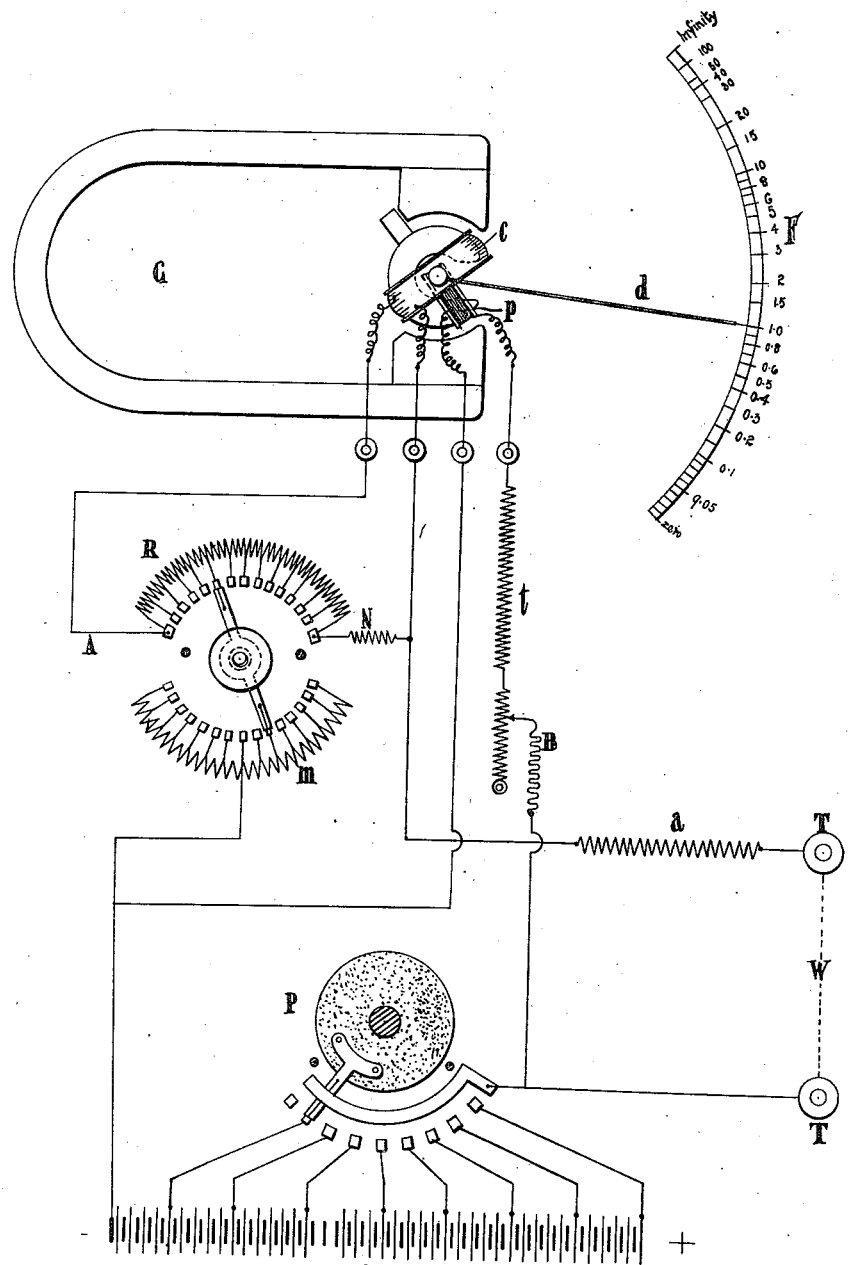

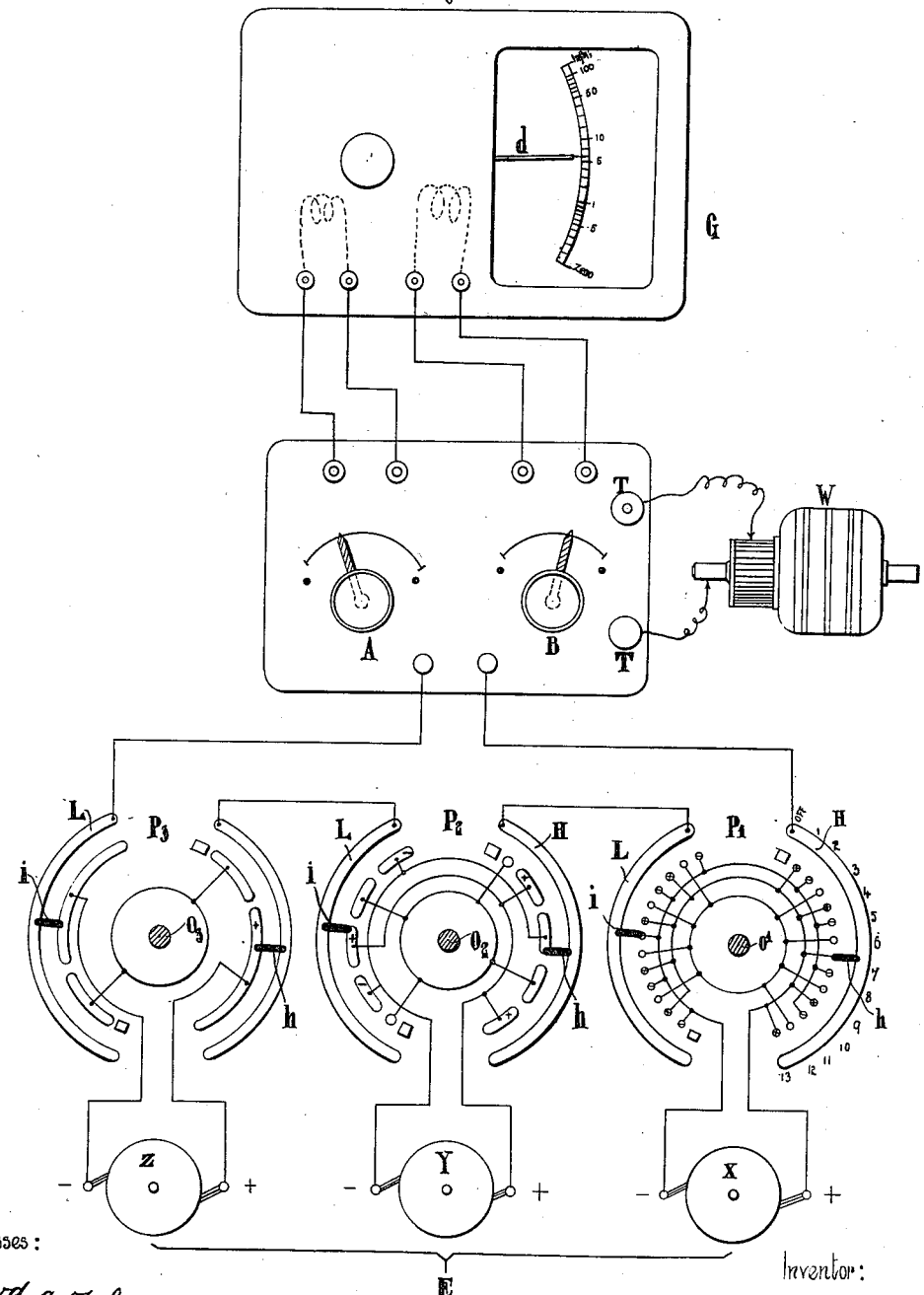

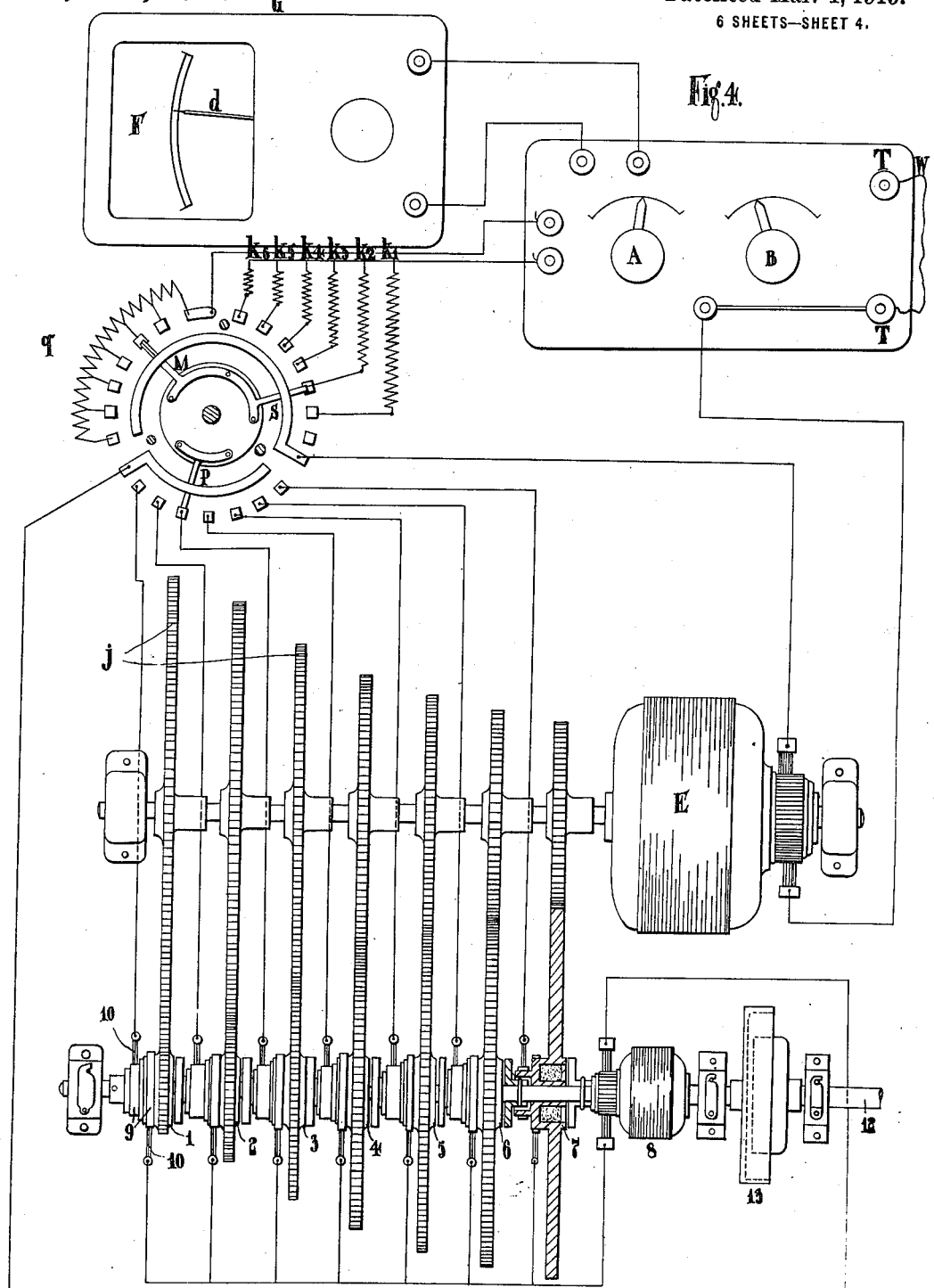

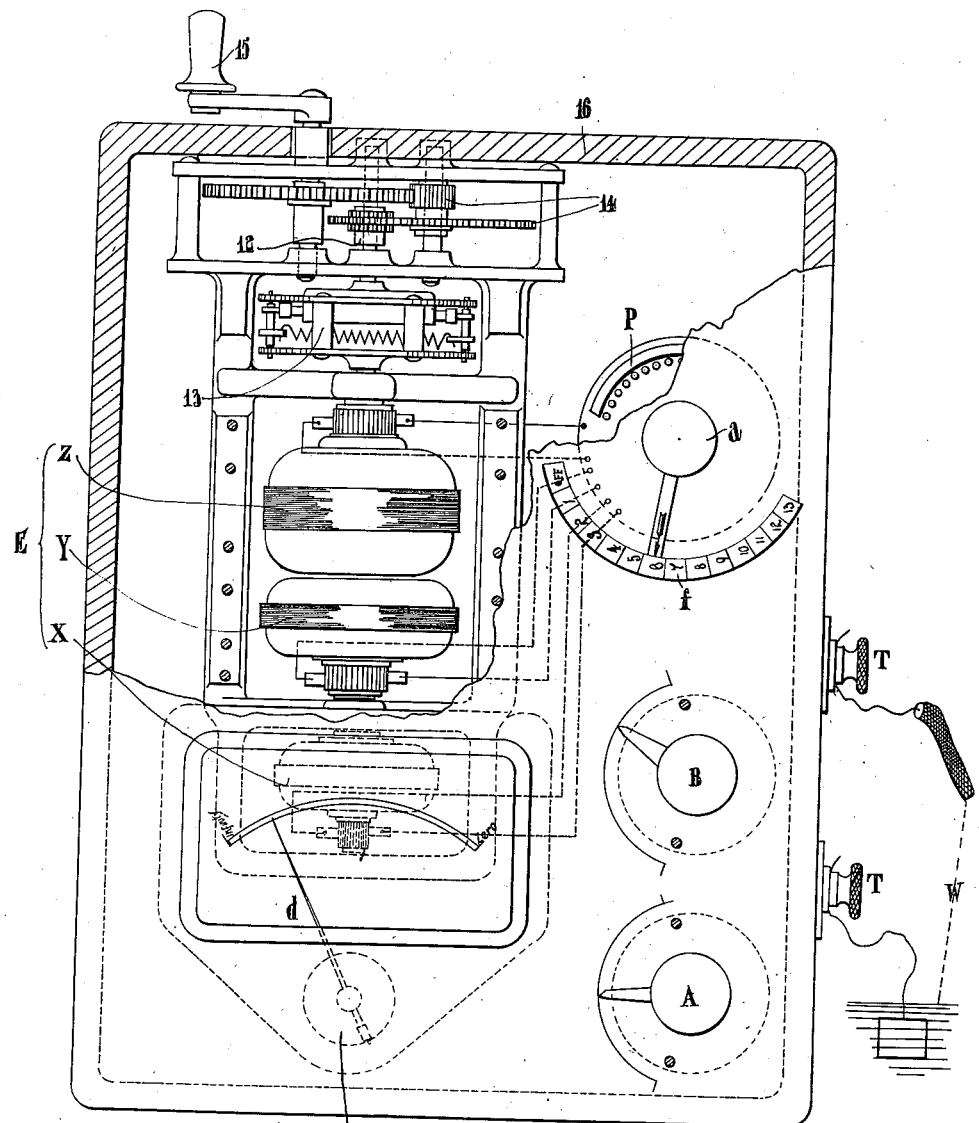

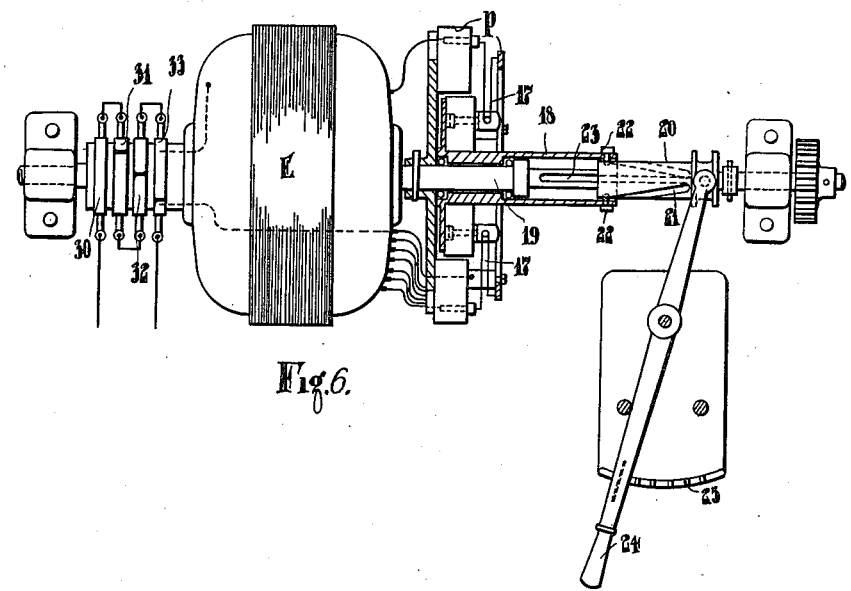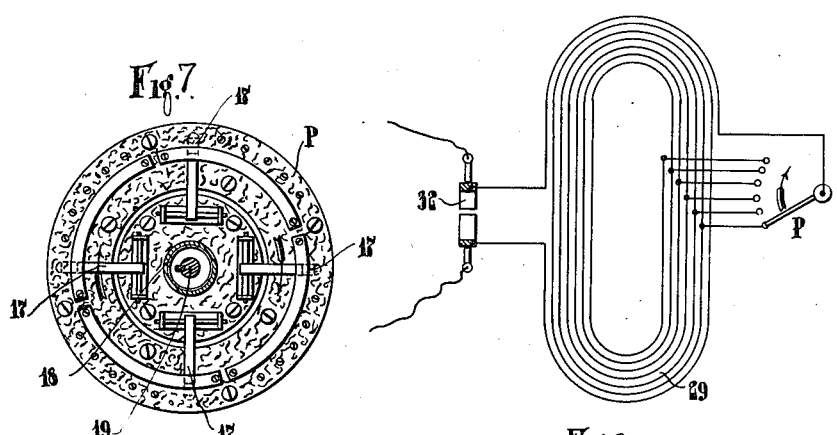

SYDNEY EVERSHED, OF CHISWICK, LONDON, ENGLAND.

RELATING TO THE TESTING OF INSULATION.

1,296,176.  Specification of Letters Patent.  Patented Mar. 4, 1919.

Original application filed March 21, 1914, Serial No. 826,372. Divided and this application filed December 30, 1915. Serial No. 69,467.

*To all whom it may concern:*

Be it known that I, SYDNEY EVERSHED, a subject of the King of Great Britain and Ireland, and residing at Acton Lane Works, Chiswick, London, W., England, have invented certain new and useful Improvements Relating to the Testing of Insulation, of which the following is a specification.

This invention relates to the testing of the insulation of electric systems and appliances and its object is to provide improved means for ascertaining the condition of the insulation.

It has been known for many years that the resistance of insulation under ordinary working conditions is usually a good deal less at a high voltage than it is at a low voltage, and for that reason it is customary to make insulation tests at some pressure not less than the working voltage, a practice which dates from the introduction of testing apparatus invented by me in or about the year 1889.

I have discovered by experimental research that one of the causes of the lower resistance at higher voltage is the presence of moisture in absorbent insulating materials in the form of drops and thin films which form leakage paths for electric current. When an insulator in that condition is subjected to electric pressure the propelling force known as electric endosmose drives water out of the drops into the films, thereby increasing their thickness and therefore decreasing the resistance of the leakage paths.

If the electric pressure is gradually increased the insulation resistance of absorbent materials falls, rapidly at first but more and more slowly as higher pressures are attained and the relation of voltage to insulation resistance may be expressed by a smooth curve which is convex to the base line from which resistance ordinates are measured, so long as the endosmose or film effect is the principal factor in determining its shape or law of curvature. But ultimately, if the increase of voltage is continued, the curve passes through a somewhat ill-defined point, or rather region, of inflection, and changing the direction of its curvature, begins to bend downward toward zero resistance, the downward curvature rapidly increasing until actual breakdown occurs. The complete characteristic curve, as it may be called, consists therefore of two parts of opposite curvature joined at a point or region of inflection, the first part indicating the film effect already described, and the second part indicating the growth of a dangerous mode of leakage which ultimately ends in a breakdown of the insulation. These two significant parts of the whole curve may be conveniently referred to as the film curve and the breakdown curve.

The law expressing the shape of the film curve is much the same for all absorbent materials, provided they do not contain more moisture than they can harbor in the form of drops and thin films; and the leakage which takes place under that condition is not of a dangerous character, since it merely consists in each film path carrying a current which is well within its capacity as a conductor. Changes in the number of films acting in parallel do not affect the safety of the insulation, nor do they alter the law of the curve, although an increase or decrease in the number of film paths necessarily lowers or raises the general level of the curve. Hence so long as the shape of the first part of the characteristic curve indicates conduction by films, the general level of the curve—high or low insulation resistance—is not a matter of much importance.

On the other hand the presence of an excessive amount of moisture, particularly when it is in the form of local accumulations of water in bulk, is apt to produce a dangerous condition in consequence of the extensive electrolytic action which takes place under such conditions if the excess of water is not detected and removed before the conductors and insulating materials have been seriously damaged. But leakage conduction of this kind follows Ohm's law, that is to say, the resistance does not vary with the voltage, and the characteristic curve would indicate this law by following a straight line parallel with the base line. Hence the shape of the first part of the characteristic curve enables safe and dangerous modes of leakage through damp insulating materials to be readily discriminated.

Again, in those numerous cases in which the insulation is made up of two components in series, one an absorbent material, and the other a non-absorbent substance which has a constant resistance, the shape of the first part of the characteristic curve will be the resultant of the two corresponding modes of conduction. Hence the failure of either component will be accompanied by a change in the shape of the curve, which will assume the shape of a normal film curve if the non-absorbent insulator breaks down, or will lose its film characteristic and become a straight line parallel to the base if the failure is in the absorbent insulator.

Lastly, the region of inflexion in the characteristic curve is a highly significant feature, since it is there that a dangerous mode of leakage begins to be indicated. Broadly speaking the place where moisture conduction ceases to be the paramount influence, and the curve begins to bend downward may be regarded as the limit for safe working and so long as the working voltage does not carry the characteristic curve beyond that point the insulation is not in danger.

In these and other ways the characteristic curve whether drawn with resistance ordinates or conductance ordinates, provides for the first time a method of insulation diagnosis, and the present practice of testing insulation may therefore be usefully amplified in the light of my discovery.

The invention broadly consists in apparatus for measuring and testing insulation resistance (or conductance) specifically adapted for the determination and investigation of the whole or any significant part— for example two properly chosen points— of the characteristic curve which expresses the relation between the voltage applied to any electric system or appliance and the resistance (or conductance) of the insulating materials of the system or appliance.

The invention also consists in the improved means relating to the testing of insulation herein described.

Much of the utility of this method of diagnosis consists in comparing the law or shape of different characteristic curves obtained either from the insulation of an electric system or appliance at different times under varying natural conditions, or from different electric systems or appliances or circuits.

In carrying out the invention the testing apparatus is arranged and adapted to facilitate such comparisons by reducing the resistance ordinates of all characteristic curves to numerical scales which are convenient for comparison preferably so that all curves shall have one coördinate point in common, which is preferably the initial point of the curve corresponding with the minimum testing pressure. By this procedure all other points on the curves are expressed by their ratios or percentages with regard to the common point. To carry out this part of the invention the resistance measuring instrument or appliance is modified by the addition of a device adapted to vary the sensibility of the instrument continuously or substantially so, over a considerable range, so that upon making the first test to determine the initial or common point, the indication of the instrument may be adjusted until it registers one hundred or one thousand or ten, or unity or some other decimal multiple or sub-multiple, of a hundred. When this adjustment has been made the resistance ordinates of the other test points on the curve will evidently be indicated as percentages of the initial resistance ordinate and the law of one curve may be readily compared with that of any other curve without the necessity for any calculations, and in many cases without even going to the trouble of plotting the characteristic curves.

In carrying out the invention the measuring instrument or appliance may be of any known type suitable for the measurement of insulation resistance or insulation conductance, but although the properties of insulators may be expressed in terms of either resistance or conductance, it has so long been the custom to regard resistance as the criterion of insulation that in describing the invention in detail it will be assumed that the testing apparatus is required to determine characteristic curves in terms of voltage and resistance.

As a matter of convenience in testing the indicating instrument may be so arranged that insulation resistance or conductance may be measured in the customary units whenever so desired without in any way limiting the power to vary the sensibility at will for the purpose of obtaining ordinates which are readily comparable.

The necessary testing pressures may be provided by a battery or alternatively by a dynamo or a magneto generator of direct current type, either hand driven or power driven as may be convenient, and adapted by means of multiple voltage devices to give the required series of testing pressures. A series of from ten to twelve pressures, suitably graded, will generally enable the complete characteristic curve to be investigated or drawn up to the breakdown point if the maximum pressure of the series is sufficient for the purpose. A series of six to eight pressures will generally suffice to draw the first part of the characteristic curve from about 50 volts up to the point of inflection and if the sole object is to determine the position of the point of inflection with respect to some assigned pressure—the working voltage of the system for example— then a series of three pressures will be enough. Any known principle either alone or in combination may be used for obtaining the multiple voltages required by my method of testing, as for example by a subdivided battery, or by varying the speed of a dynamo, or by varying the induction or the number of effective turns of wire in the armature of a dynamo, or by a number of windings on a single armature each connected to one of a corresponding number of commutators, or by a multiple armature each element having its appropriate winding.

In order that my invention may be better understood it will now be described with reference to the accompanying drawings in which:

Figure 1 is a diagram of a complete apparatus for investigating the whole or any part of the voltage-resistance curve of insulation;

Fig. 2 is a modification of the same in which the indicating instrument is an ohm-meter;

Fig. 3 is another modification in which the electromotive forces generated by three dynamo armatures are combined to form a series of testing pressures by means of a permutation switch;

Fig. 4 is another modification of the same in which the speed of the generator which provides the testing current is varied by means of a change speed gear in order to give a series of testing pressures;

Fig. 5 illustrates apparatus for carrying out the improved method arranged in a box for portability;

Figs. 6, 7 and 8 show a modified form of multiple voltage generator;

In Figs. 3, 4, 5, and 6 the armatures of the multiple voltage generator are alone shown, the field magnets and pole pieces being omitted in order to avoid confusion.

In Fig. 1, E is a source of direct current adapted to give a suitable series of testing pressures, P is a multiple point switch adapted so as to apply any of the series of pressures to the insulation resistance W which is to be investigated. G is an indicating instrument adapted to show the value of the resistance under test, and A and B are two parts of a variable shunt to the instrument coil C, by means of which the initial reading of a series may be adjusted to some convenient initial or common point. T T are the terminals which serve to connect the testing apparatus to the insulation resistance which is to be tested.

In Fig. 1 the indicating instrument G is shown by way of example as a galvanometer, $e$ being the galvanometer coil, $d$ the index and F the scale. To obtain readings which are proportioned to the resistance of the circuit the scale is shown divided and figured in inverse proportion to the current traversing the coil $c$, and to adjust the initial reading of a series to a common point the coil $c$ is connected to a variable shunt which may conveniently be of the Ayrton Mather "universal" type as shown in the drawings. To provide for coarse and fine adjustments the shunt is divided into two parts R and $r$ each sub-divided into a convenient number of sections and controlled by a multiple point switch. For convenience the resistance $r$ may be equal to a single section of the larger resistance R. To maintain the resistance of the shunted galvanometer at an approximately constant value the switch A is provided with a second switch arm which controls a series of "make-up" resistances $m$ $m$, and as a universal shunt gives the maximum resistance to the shunted galvanometer (i. e. to the combined galvanometer coil and the part of the resistance in parallel with it) when the current divides equally between the galvanometer coil and the shunt, the make-up resistance will be reduced to zero at that point. A resistance $a$ of large value is added in series with the shunted galvanometer in order to avoid excessive currents when the resistance W happens to be very low or to break down under test. The value of $a$ may easily be made ten or even one hundred times as great as the resistance of the shunted galvanometer so that a comparatively rough adjustment of the make-up resistance $m$ $m$ will be sufficient.

In order that the galvanometer G may indicate in the same resistance units throughout the whole series of testing pressures, the voltage switch P is mechanically coupled to a multiple-point shunt switch S which controls a number of resistances $k_1$, $k_2$, $k_3$, etc., which serve as a series of shunts on the combined resistance formed by the resistance $a$ and the shunted galvanometer. The value of each of these shunts is reckoned from the formula:—

Resistance of shunt $k_n = (a+g)/(n-1)$, where $g$ is the constant resistance of the shunted galvanometer and $n$ is the ratio of the testing voltage (for which the shunt $k_n$ is required), to the initial voltage of the ascending series of testing pressures. In Fig. 1 the source of testing pressure E is shown by way of example as a battery subdivided into eight equal sections and controlled by the eight point switch P. Hence the shunt switch S also has eight positions and at the first point, corresponding with the testing pressure of a single section of the battery, the switch S stands at a blank contact so that the whole of the testing current traverses the circuit formed by the galvanometer G and the universal shunt A, B. In this example the values of the shunts $k_1, k_2, k_3 \ldots k_7$, must evidently be $(a+g)$, $\frac{1}{2}(a+g)$, $\frac{1}{3}(a+g) \ldots \frac{1}{7}(a+g)$. It is desirable that the total resistance of the current circuit of the testing apparatus should be constant notwithstanding the effect of the shunts introduced by the switch S, and with this object another switch M is added to control a series of make-up resistances $q$.

In Fig. 1 the apparatus is shown with the initial voltage of the series applied for testing the insulation represented by W, and the common point shunt A B is set for the minimum shunting effect. When so set the scale F may conveniently be arranged to read direct in megohms, and in that case the pointer $d$ indicates 32 megohms. To bring the pointer to the required common point— in this example the scale division marked 100 would naturally be chosen as the initial or common point—the shunting effect is gradually increased by moving the contact arms of the shunt A B in the direction of the arrows, first obtaining a rough adjustment by means of A and next making a fine adjustment by means of B until the pointer stands at the scale reading 100. To facilitate the accurate setting of the pointer to the desired initial reading, a small continuously adjustable rheostat may be introduced as indicated at N.

Having set the galvanometer reading to the common point the voltage is then increased step by step by turning the voltage switch P in the direction of the arrow, the switches S and M being of course carried around from point to point at the same time. Proceeding in this way, eight ordinates of the voltage resistance curve of the insulation W, (corresponding with the series of eight testing pressures) are rapidly obtained, and if the initial ordinate be adjusted to 100 then all the others are expressed as percentages and may be readily compared with other ordinates obtained from other insulation or from the same insulation under different conditions.

With this apparatus the insulation resistance of W at any desired voltage of the series may be obtained in megohms at any time by merely restoring the common point shunt A B to the initial position of minimum shunting effect.

In Fig. 2 the indicating instrument G is an ohmmeter, $c$ being the current coil, and $p$ the pressure coil. The coarse adjustment to a common point is effected by a universal shunt A on the current coil, and the fine adjustment may be effected by similar means to those shown in Fig. 1, or preferably by forming a part of the resistance $t$ (which is in series with the pressure coil $p$) as an adjustable rheostat B. In Fig. 2 the adjustments A and B have already been effected and the pointer $d$ is shown standing at the scale division marked 1 preparatory to raising the testing voltage step by step to obtain the required series of resistance ordinates. In this example the switches S and M are dispensed with because the substitution of an ohmmeter in place of a galvanometer as the indicating instrument renders it unnecessary to make any provision of the kind.

In either case by whatever means the step by step adjustments of the measuring instrument are made to correspond with the pressure it is convenient to have the adjustment devices geared to or interlocked with the devices which effect the changes in testing pressure, so that corresponding adjustments and voltage changes may be carried out either by the movement of one handle or by the coördinated movements of two interlocked handles.

The measuring instrument may conveniently have the scale so divided and figured that it gives direct readings in ohms or megohms when the instrument is arranged to give the maximum sensibility, as for example when the shunt for continuous variation of sensibility is set for the minimum shunting effect.

In Fig. 3 the testing pressure E is provided by three dynamo or magneto armatures X Y Z, so coupled together mechanically—preferably by mounting them on one axle—as to constitute a multiple-voltage testing generator. This generator which may be driven by hand or by power, is adapted to run at a constant speed either by means of a centrifugal clutch or other known means such as a constant speed motor. The three armatures are so wound as to give three component pressures which when added algebraically, will give a number of suitable testing pressures. For example if the initial pressure is to be $e$ volts when armature X should be wound to give $e$ volts, and to obtain the greatest number of testing pressures from the three armatures, Y and Z must be wound to give $3e$ volts and $9e$ volts respectively.

The armatures X Y and Z are connected electrically to the three members $P_1$, $P_2$, $P_3$ of a triple permutation switch. Each of these members consists of a multiple point double-pole switch; $P_1$ having 13 points to each pole, $P_2$ having 5 points to each pole; and $P_3$ having 2 points to each pole. Insulated sliding contacts $h$ $i$ which serve to connect any pair of points with the slip rings H L, are fixed to and rotate with the axles $O_1$, $O_2$, $O_3$ and these axles are mechanically coupled so that they all rotate together in the same sense and through equal angles. For example the three members of the permutation switch may be mounted one above the other so that the insulated contacts $h$ $i$ may be fixed to an axle which is common to all three members. The internal connections of the switch points are such that in the case of the member $P_1$ the potential difference between the slip rings H and L is alternately $+e$, $-e$, zero, $+e$, $-e$, zero, and so on as the axle O is rotated in a clockwise direction from point 1 to point 13. During these step by step changes the potential difference between the slip rings of the member $P_2$ is as follows:—zero, $+3e$, $+3e$, $+3e$, $-3e$, $-3e$, $-3e$, zero, zero, zero, $+3e$, $+3e$, $+3e$; and the potential difference between the slip rings of the member $P_3$ is zero for the first four steps made by $P_1$ and $+9e$ during the remainder of the thirteen steps.

These permutations result in the algebraic addition of the three component pressures generated by the armatures X Y and Z in thirteen different ways as set forth in the following table:—

| Step number. | Potential difference of slip rings on members— | | | Algebraic sum of the component pressures. |
|---|---|---|---|---|
| | $P_3$ | $P_2$ | $P_1$ | |
| 1 | 0 | 0 | $+e$ | $e$ |
| 2 | 0 | $+3e$ | $-e$ | $2e$ |
| 3 | 0 | $+3e$ | 0 | $3e$ |
| 4 | 0 | $+3e$ | $+e$ | $4e$ |
| 5 | $+9e$ | $-3e$ | $-e$ | $5e$ |
| 6 | $+9e$ | $-3e$ | 0 | $6e$ |
| 7 | $+9e$ | $-3e$ | $+e$ | $7e$ |
| 8 | $+9e$ | 0 | $-e$ | $8e$ |
| 9 | $+9e$ | 0 | 0 | $9e$ |
| 10 | $+9e$ | 0 | $+e$ | $10e$ |
| 11 | $+9e$ | $+3e$ | $-e$ | $11e$ |
| 12 | $+9e$ | $+3e$ | 0 | $12e$ |
| 13 | $+9e$ | $+3e$ | $+e$ | $13e$ |

In Fig. 3 a triple permutation switch is shown in a simple form in order that the principle by which several component pressures may be added to give a series of voltages may be readily understood. Permutation switches embodying the same principle may be made to add two, three, four or more component pressures giving a series of 4, 13, 40 or more voltage steps. The mechanical construction and the disposition of the various parts of such switches may evidently be varied widely without departing from the principle of algebraic addition.

By way of example the permutation switch in Fig. 3 is shown in connection with a common point adjuster A B and an ohmmeter G the diagram of connections being similar to Fig. 2. The insulation resistance W, under test, is that between the commutator and windings of an armature and the armature axle.

In Fig. 4 the testing voltage is supplied from a variable speed generator E which is driven from the shaft 12, through a centrifugal constant speed clutch 13 and change-speed gear J. Seven pairs of gears are shown suitably graduated as regards velocity ratio, and by way of example these gears are shown as actuated by means of seven friction clutches 1, 2, 3, . . . 7 of the magnetic type. These clutches are controlled by a multiple point switch P, current being led to the exciting coils of the clutches by means of slip rings and brushes as indicated by 9 and 10. Current for the magnetic clutches may be derived from any suitable supply, and in the absence of any other available source a small dynamo may be provided for the purpose and driven at a constant speed, preferably by mounting its armature 8 upon the constant speed shaft 70 of the change-speed gear. The connections of the galvanometer indicated correspond to Fig. 1.

Other known forms of change-speed gear may be employed preferably of the types which are actuated by friction clutches, and when the indicating instrument G is a galvanometer, the mechanism which actuates the clutches should be mechanically connected to or interlocked with the voltage shunt switch S and "make-up" switch M. This interlocking connection is of course effected in the simplest possible manner when magnetic friction clutches are used.

For portability and convenience in use, a multiple voltage generator and a measuring instrument with or without any of the various devices herein described for facilitating the process of testing by my method, may be mounted in one box or case or the generator and any of the devices may be so mounted or again the instrument and any of the devices may be similarly mounted.

One such arrangement is illustrated in plan in Fig. 5. The testing generator E shown in this drawing is of the three-component type and is arranged for hand driving by means of a winch handle 15. The necessary high speed is obtained by suitable gearing 14 interposed between the winch axle and the axle 12. One end of the axle 12 carries the friction drum of a constant speed centrifugal clutch 13, by which means the three armatures X Y and Z are driven at a constant speed whenever the slipping speed of the clutch 13 is exceeded. Since the armatures Y and X are only required to generate one-third and one-ninth the pressure generated by Z they may be suitably graduated in size, and to avoid a long span between the bearings of the armature axle, the armature X may be overhung outside the end bearing. The carrying box 16 may be so proportioned as to provide space for the indicating instrument G at one end, and for the common point adjusters A B, and the permutation switch P, alongside the multiple voltage generator and the indicating instrument.

The methods of obtaining a suitable series of testing pressures described in connection with Figs. 1 to 5 may be modified in various ways. For example when the armature of the testing generator is wound with a number of separate coils each connected to one of a number of distinct two part commutators (an arrangement commonly used in generators for insulation testing) then a series of voltages may be readily obtained from the one armature by connecting a number of tappings from each coil to a multiple point switch, the switch being mounted upon the armature axle and operated by suitable means. A multiple voltage armature con-structed on this principle is illustrated in Fig. 6 where E represents an armature wound with four separate coils connected severally to the four two part commutators 30, 31, 32 and 33. Each coil has one end permanently connected to one segment of its commutator, the other commutator segment being connected to the contact arm of a multiple point switch P as indicated in Fig. 8. At suitably graded intervals in the course of the winding 29, tappings are brought to the contact studs of the switch P so that the whole or any pre-arranged portion of the winding may be connected to the commutator. In this way each armature coil may be made to provide a series of pressures, and by connecting the brushes of the commutators 30, 31, 32 and 33 in series, as indicated in Fig. 6, the separate pressures of the four coils are added together to provide the testing voltage.

There being four armature coils, the complete switch P in Fig. 6 will be composed of four multiple point switches as shown in end-elevation in Fig. 7. The four insulated contact arms 17 are mounted upon a sleeve 18 which is free to rotate on the armature axle 19. Guide pins 22, which project inside an extension of the switch sleeve 18, engage in spiral slots 21 formed on the outside of an operating sleeve 20. The operating sleeve can slide to and fro on the armature axle but is prevented from turning around on it by a feather 23 which engages in a keyway inside the sleeve. The operating sleeve 20 can be set at will to any one of a number of positions along the armature axle by means of the fork lever 24 which can be retained in the desired position by a notched sector 25 or equivalent device. By these means, or their equivalent, the longitudinal motion given to the sleeve 20 is converted into a rotational movement of the contact arms of the switch P and hence the switch can be set to any desired position notwithstanding the rotation of the armature.

In Figs. 6, 7 and 8, 6-way switches are shown, by way of example, corresponding to a series of six testing pressures. Similar switches may be made for a larger number of ways provided the overall diameter of the complete switch can be sufficiently enlarged to admit of the necessary addition to the number of contact studs.

The invention is not confined to the particular arrangements described, but may be modified in various ways without departing from the underlying principle of diagnosis. For example if it is desired to carry out the invention by means of voltage-conductance curves instead of voltage-resistance curves the measuring instruments would be modified to indicate conductance units. In the case of a galvanometer the modification would consist merely in dividing the scale in direct proportion to the current; in the case of an ohmmeter, the scale would be divided in inverse proportion to the resistance and figured in reciprocal ohms or other units of conductance. A Wheatstone bridge or a differential galvanometer would need no modification except in the rheostats in the adjustable third arm, which would be composed of a number of unit resistances adapted so that any desired number could be connected up in parallel to give any total value of conductance. These and other similar inversions either necessary or convenient for the purpose of converting resistance measuring apparatus into conductance measuring apparatus will be readily understood by those who are conversant with the art of electrical measurement.

It is to be understood that in making measurements to determine two or more points on a characteristic curve the tests must proceed by ascending voltages from the lowest required testing pressure upward step by step to the highest pressure of the required series, in order that hysteresis effects, which are a marked feature of conduction through absorbent insulators, may be avoided.

Having now described my invention what I claim as new and desire to secure by Letters Patent is:—

1. Apparatus for determining any significant part of the characteristic curve of insulation comprising in combination a measuring instrument whose scale readings are dependent on the current traversing it, a variable shunt in parallel with the measuring instrument adapted to vary the sensibility of the measuring instrument so that its scale readings may indicate ratios with respect to a convenient fiducial value, variable make-up resistances to maintain the resistance of the shunted instrument constant, a resistance of relatively large value in series with the measuring instrument, a source of electromotive force giving the required series of testing pressures, a shunt of selective resistances in parallel with the said shunted instrument and said resistance in series therewith, a switch for simultaneously selecting the value of the electromotive force and the appropriate selective resistance of the shunt, and make-up resistances to maintain the total resistance of the testing circuit constant.

2. Apparatus for determining any significant part of the characteristic curve of insulation comprising in combination an ohmmeter, a variable shunt to the current coil of the ohmmeter, a resistance in series with the pressure coil of the ohmmeter, variable make-up resistances to maintain the resistance of the shunted ohmmeter constant, a resistance of relatively large value in series with the current coil of the ohmmeter, a source of electromotive force adapted to give the required series of testing pressures, and a switch for selecting the value of the electromotive force.

3. Apparatus for determining any significant part of the characteristic curve of insulation, comprising in combination a measuring instrument whose scale readings are dependent on the current flowing through it, means for varying the sensibility of the said instrument so that in a series of tests of a specimen under different voltages its readings may be expressed as the ratios of a convenient fiducial value, a multiple voltage generator adapted to give a plurality of voltages, and a permutation switch adapted to select from the said generator the required series of testing pressures.

4. Apparatus for determining any significant part of the characteristic curve of insulation, comprising in combination a measuring instrument whose scale readings are dependent on the current flowing through it, means for varying the sensibility of the said instrument so that in a series of tests of a specimen under different voltages its readings may be expressed as the ratios of a convenient fiducial value, a variable speed generator, driving means, a centrifugal constant speed clutch on the said driving means, change speed gearing between the said clutch and the said generator, a switch and electro-magnetic means for selecting the required speed ratio of the change speed gearing to give the required speed and testing pressure to the said generator.

5. Apparatus for determining any significant part of the characteristic curve of insulation, comprising in combination a measuring instrument whose scale readings are dependent on the current flowing through it, means for varying the sensibility of the said instrument so that in a series of tests of a specimen under different voltages its readings may be expressed as the ratios of a convenient fiducial value, a variable speed generator, driving means, a centrifugal constant speed clutch on the said driving means, change speed gearing with a series of speed ratios between said clutch and the said generator, friction clutches for selecting the required speed ratio of the change speed gearing, and a switch and electro-magnetic means for selecting the required speed ratio of the change speed gearing to give the required speed and testing pressure to the said generator.

6. Portable apparatus for determining any significant part of the characteristic curve of insulation, comprising in combination a measuring instrument whose scale readings are dependent on the current flowing through it, means for varying the sensibility of the said instrument so that in a series of tests of a specimen under different voltages its readings may be expressed as the ratios of a convenient fiducial value, a multiple armature generator adapted to give a plurality of voltages, a permutation switch adapted to select from the said generator the required series of testing pressures, driving means, a constant speed centrifugal clutch between the said driving means and the armature shaft of the said generator, and a carrying box in which the aforesaid apparatus is contained.

In testimony whereof, I have affixed my signature.

SYDNEY EVERSHED.